United States Patent
Kim (10) Patent No.: US 7,170,879 B2
(45) Date of Patent: Jan. 30, 2007

(54) METHOD AND SYSTEM FOR INTER-WORKING AN ANSI TYPE RADIO ACCESS NETWORK IN THE INTERNET PROTOCOL BASED CORE NETWORK

(75) Inventor: Hyoung taek Kim, Gunpo-si (KR)

(73) Assignee: LG-Nortel Co., Ltd., Seoul (KR)

( * ) Notice: Subject to any disclaimer, the term of this patent is extended or adjusted under 35 U.S.C. 154(b) by 964 days.

(21) Appl. No.: 10/026,779

(22) Filed: Dec. 27, 2001

(65) Prior Publication Data
US 2002/0085532 A1 Jul. 4, 2002

(30) Foreign Application Priority Data
Dec. 28, 2000 (KR) ................................ 2000-84725

(51) Int. Cl.
H04Q 7/24 (2006.01)
H04J 3/24 (2006.01)
H04L 12/66 (2006.01)

(52) U.S. Cl. ..................... 370/338; 370/349; 370/352

(58) Field of Classification Search ................ 370/338, 370/349, 352, 356, 401, 466, 467
See application file for complete search history.

(56) References Cited

U.S. PATENT DOCUMENTS

| | | | |
|---|---|---|---|
| 6,359,880 B1* | 3/2002 | Curry et al. ................. | 370/352 |
| 6,515,985 B2* | 2/2003 | Shmulevich et al. ........ | 370/356 |
| 6,608,828 B1* | 8/2003 | Balachandran .............. | 370/349 |
| 6,788,675 B1* | 9/2004 | Yang ........................... | 370/352 |
| 6,839,356 B2* | 1/2005 | Barany et al. ............... | 370/401 |
| 2001/0053145 A1* | 12/2001 | Willars et al. .............. | 370/352 |
| 2002/0105969 A1* | 8/2002 | Benedyk et al. ............ | 370/466 |
| 2004/0017798 A1* | 1/2004 | Hurtta et al. ................ | 370/352 |

* cited by examiner

Primary Examiner—Ricky Q. Ngo
Assistant Examiner—Venkatesh Haliyur
(74) Attorney, Agent, or Firm—Fleshner & Kim, LLP

(57) ABSTRACT

A method and a system for inter-working an ANSI type radio access network (RAN) in an Internet Protocol (IP) based core network (CN) is disclosed. The method and a system provide for matching primary network components, such as the mobile switching center (MSC) and the base station controller (BSC), so as to inter-work an ANSI Type RAN in the IP based CN, while causing minimum modifications in the currently operated ANSI type RAN and establishing the IP based CN for accommodating the IP based ANSI type RAN. A unified communication network is thus provided by matching the RAN and the CN based upon the IP using a method and a system for signal connection and traffic transfer connection required for the network matching. As a result, a CN may be established, having the transfer path between a RAN and the CN based upon common technology such as IP. Furthermore, because the present invention accommodates a RAN directly within the IP basis, no separate conversion device is required for the wireless Internet service provision.

21 Claims, 5 Drawing Sheets

METHOD AND SYSTEM FOR INTER-WORKING AN ANSI TYPE RADIO ACCESS NETWORK IN THE INTERNET PROTOCOL BASED CORE NETWORK

BACKGROUND OF THE INVENTION

1. Field of the Invention

The present invention relates to a mobile communication network, and more particularly to a method and system for inter-working an ANSI type radio access network (RAN) in an Internet Protocol (IP) based core network (CN).

2. Background of the Related Art

The mobile communication network introduced in "TIA/EIA 3G-IOS V4.0.0 V&V Draft 5 November 1999" is composed of a RAN and a CN, each of which is further composed of functional network components for providing mobile communication service. Here, the term IOS (Inter-Operability Specification) is a matching protocol between a Base Station Controller (BSC) and a Mobile Switching Center (MSC). IOS is a radio communication application protocol for conducting call connection and disconnection functions for mobile communication service subscribers.

The CN is established primarily with a circuit switching system based upon time division multiplexing (TDM). The network components that make up the CN are associated with one another with the CN's physical connection and the logical matching protocol.

Thus, a matching standard of a RAN depends on the structure of the relevant CN. A related art CN and RAN are matched by the common-channel signaling method (No. 7) on the TDM based circuit connection.

Figure 1:
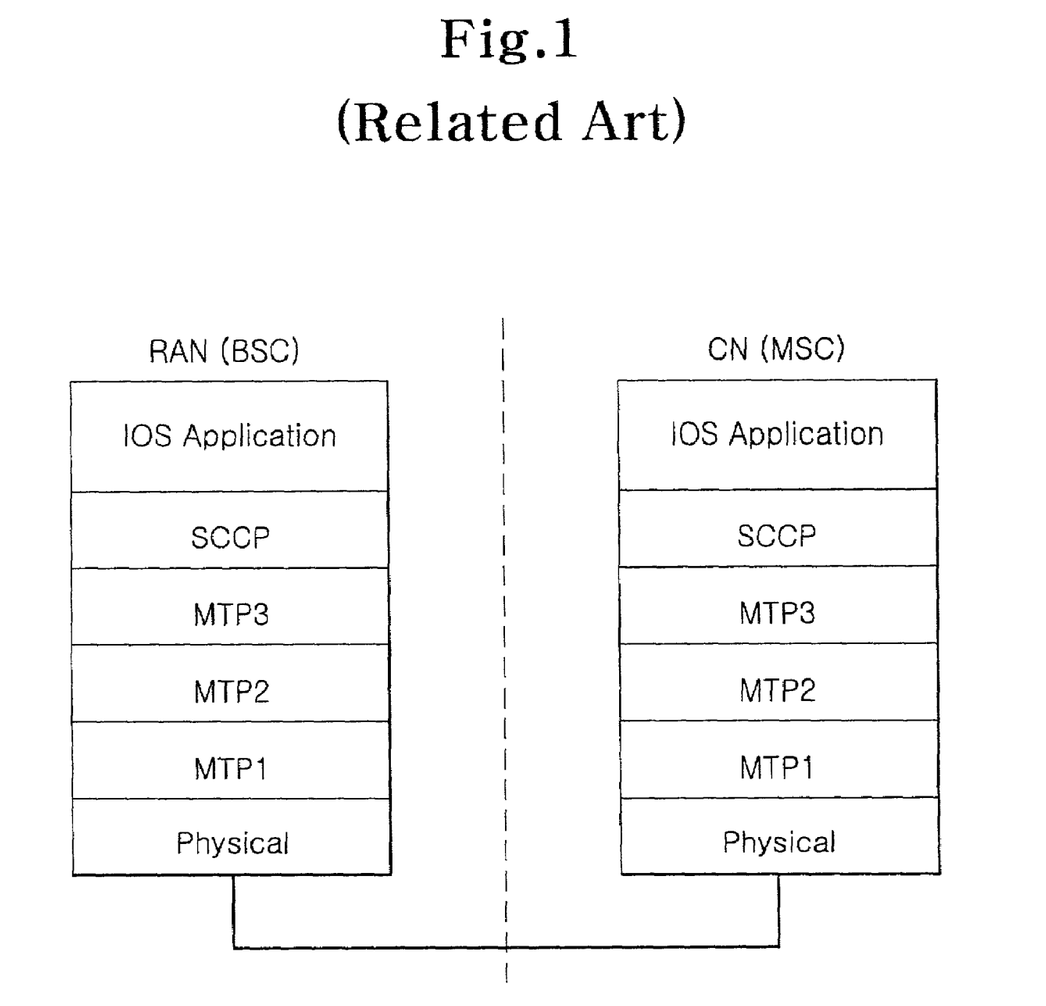
FIG. 1 illustrates a related art inter-working protocol stack of a Radio Access Network (RAN) and a Core Network (CN).

FIG. 1 illustrates related art stacks of matching protocols between a CN and a RAN. As shown in FIG. 1, in a voice switching service, the CN, which includes a mobile communication network described in "TIA/EIA 3G-IOS V4.0.0 V&V Draft 5 November 1999," is constructed with a circuit switching network based upon the TDM of the synchronous transfer mode (STM). The CN is connected to the RAN through the trunk line matching based upon the G. 703 pulse code modulation (PCM).

To provide the mobile communication switching service, the signal connection between the CN and the RAN is made through a signal network by the narrow band common-channel signal method (Narrow Band No. 7). Furthermore, the mobile communication call is connected using the IOS for the traffic connection. The voice switching service is provided using the TDM technique of the circuit switching method.

On the other hand, for a data switching service, the CN and the RAN are connected with each other through high-speed packet network matching based upon the Internet Protocol (IP). In other words, for data communication, the radio communication data service is provided using the packet routing technique. Accordingly, different communication networks are established with the CN for the voice switching and for the data service. Thus, user service is provided through dual CN structures.

The related art has various disadvantages. For example, because the CN is constructed based upon the circuit switching network of the STM for the radio communication service, the CN conducts signal transmission control using the narrow band common-channel signal method for the purpose of matching with the RAN, and traffic transfer is made using the circuit transmission based upon TDM. Thus, for the transmission of non real-time transfer objects, such as packets or circuit data, the resource may be wasted due to the ordinary occupation of the virtual circuit.

Furthermore, the basic transfer objects within the RAN are packet-based. However, in order to conduct the inter-working with the CN, an additional process of converting packets for the circuit is required. Accordingly, a complex protocol is required to separately control voice data and packet data.

Also, because the radio communication CN establishes different communication networks for voice switching service and for the data switching service, the dual access method causes burdensome overheads in the CN operation.

Additionally, in order to inter-work the voice switching CN with a packet network such as the Internet, a separate inter-working function (IWF) is necessary and a complex control protocol is required.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a unified network integrating a RAN and a CN.

Another object of the present invention is to provide a method and a system for signal connection and traffic transmission connection required for matching a RAN and a CN.

It is another object of the present invention to provide a method and a system for inter-working an ANSI type radio access network (RAN) in the Internet Protocol (IP) based core network (CN).

It is another object of the present invention to provide a method and a system for matching primary network components such as the mobile switching center (MSC) and the base station controller (BSC) so as to inter-work an ANSI Type RAN in the IP based CN, while causing minimum modifications in the currently operated ANSI type RAN and establishing the IP based CN for accommodating the IP based ANSI type RAN.

Another object of the present invention is to establish a RAN and a CN with the IP based communication network and thereby to provide the CN, wherein the transfer path between the RAN and the CN is based upon the general technology such as the IP, making it easy to construct a system and inducing cost reduction.

Another object of the present invention is to accommodate the RAN directly within the IP based technology without using any separate inter-working function (IWF) device for the wireless Internet service.

In order to achieve at least the above objects in a whole or in part, there is provided a method for inter-working a RAN in the IP based CN including making a traffic connection between a mobile station (MS) at the caller side and a BSS-IP at the caller side using a pre-determined protocol upon receiving a call connection request message from the MS at the caller side; interpreting a directory number (DN) of the MS at the call receiver side as requested by the caller MS and making a traffic connection between the MS at the call receiver side and the BSS-IP at the call receiver side using a pre-determined protocol; generating a ring-back tone using a pre-determined protocol so that the MS at the caller side may receive the ring-back tone; and discontinuing the ring-back tone using a pre-determined protocol if the MS at the call receiver side responds and establishing the call connection between the MS at the caller side and the MS at the call receiver side. The pre-determined protocols preferably include the matching signal protocols for the signal connection transfer and the traffic connection control protocols. The matching signal protocols preferably include M3UA (MTP3 User Adaptation), SCTP (Stream Control Transmission Protocol), IP, MGCP (Media Gateway Control Protocol), IOS Application, SCCP (Signaling Connection Control Protocol), UDP (User Datagram Protocol), LLC (Logical Link Control) and Physical. The traffic connection control protocols include RTP (Real Time Protocol)/RTCP (Real Time Control Protocol), UDP, IP, Voice Encoded Data, LLC, MAC and Physical.

Preferably, the step of making the traffic connection between the MS at the caller side and the BSS-IP at the caller side includes the steps of the wireless call agent (WCA)'s receiving a call connection request message transmitted from the MS at the caller side through the BSS-IP at the caller side (BSS-IP1); interpreting the DN of the MS at the call receiver side as requested by the MS at the caller side; transmitting a connection request message to the BSS-IP at the caller side using the MGCP if the DN is determined valid; assigning traffic connection ports to the IP network of the currently connected MS at the caller side and then transmitting a response message to the WCA; transmitting a resource assignment message to the BSS-IP at the caller side using the UDP port number; and confirming the completion of the traffic connection to the MS at the caller side and then transmitting a response message to the WCA.

Preferably, the step of making the traffic connection between the MS at the call receiver side and the BSS-IP at the call receiver side includes the steps of transmitting a paging message to the MS at the call receiver side through the BSS-IP at the call receiver side (BSS-IP2) by interpreting the DN of the MS at the call receiver side as requested by the MS at the caller side; responding to the WCA by transmitting an IOS message to the WCA through the BSS-IP at the call receiver side upon recognizing the paging message; assigning UDP ports to the BSS-IP at the call receiver side for the traffic connection with the caller side and requesting a connection with an available connection port of the IP network to be connected to the BSS-IP at the call receiver side, by transmitting an MGCP message; assigning the traffic connection ports of the MS at the call receiver side and then transmitting a response message to the WCA; transmitting a resource assignment message to the BSS-IP at the call receiver side using the UDP port number; and confirming the completion of the traffic connection to the MS at the call receiver side and then transmitting a response message to the WCA.

Preferably, the step of generating the ring-back tone includes the steps of transmitting to the tone source the IP network traffic connection request message together with the IP traffic UDP port number of the MS at the caller side, the user traffic's voice message transcoding method and the protocol information for the end-to-end real-time message processing, using the MGCP, so that the MS at the caller side may receive the ring-back tone; modifying the connection traffic path of the MS at the caller side to a ring-back tone traffic channel; connecting the IP traffic port of the MS at the caller side to the ring-back tone traffic channel and then transmitting a response message to the WCA; transmitting to the BSS-IP at the caller side a modification connection request message together with the user traffic's voice message transcoding method and the protocol information for the end-to-end real-time message processing, using the previously assigned user ports; modifying the connection traffic path of the MS at the caller side to a ring-back tone traffic channel; connecting the IP traffic port of the MS at the caller side to the ring-back tone traffic channel and then transmitting a response message to the WCA; transmitting a notification request message to the tone source using the MGCP; and generating the ring-back tone through the traffic channel of the currently connected MS by referring to the notification request message and then transmitting a response message to the WCA.

Preferably, the step of establishing the call connection between the MS at the caller side and the MS at the call receiver side includes the steps of transmitting a connection message from the MS at the call receiver side to the WCA through the BSS-IP at the call receiver side using the IOS message; transmitting a notification request message to the tone source using the MGCP; stopping the generation of the ring-back tone which has been transmitted and then transmitting a response message to the WCA; transmitting a connection delete message to the tone source; disconnecting the tone connection path on the IP network and then transmitting a response message to the WCA; transmitting a modification connection request message to the BSS-IP at the caller side together with the user traffic UDP port number of the BSS-IP at the call receiver side, voice message transcoding method on the user traffic and the protocol information for the end-to-end real-time message processing; connecting the IP network traffic channel of the MS at the caller side under its management to the user traffic channel of the BSS-IP at the call receiver side and transmitting a response message to the WCA; and transmitting the connection message to the MS at the caller side and thereby establishing the call connection between the MS at the caller side and the MS at the call receiver side.

In order to further achieve at least the above objects in whole or in parts, there is provided a system for inter-working a RAN in an IP based CN, including a WCA for conducting call connections and routing functions by controlling all gateways accommodated in the IP based CN; a BSS-IP (Base Station Subsystem for Internet Protocol) for conducting gateway functions by controlling the RAN and communicating with the WCA; a TG Trunk Gateway) for conducting the voice traffic matching functions between the IP based CN and the conventional wire network and providing service functions unique to the voice communication; an SG (Signaling Gateway) for providing No. 7 signal connection matching function between the IP based CN and the conventional wire network; an HLR (Home Location Register) for managing mobile communication subscribers' locations within the mobile communication network and conducting the mobility control; and a PDSN (Packet Data Serving Node) for conducting the inter-working of the IP network and the mobile communication CN so as to provide packet data services for the mobile communication subscribers.

Preferably, the IP based CN may be routed by the IP based upon the connection of the ATM (Asynchronous Transfer Mode) or a high-speed packet network.

Preferably, in between the BSS-IP and the WCA are matching signal protocol stacks for the signal connection transfer. In between the BSS-IP and TG are traffic connection control protocol stacks.

Preferably, the matching signal protocol stack matches protocols below the MTP3 layer with the M3UA, SCTP and IP, adds the MGCP for controlling the BSS-IP's status and connection, and includes the IOS Application, SCCP, UDP, LLC, MAC and Physical.

Preferably, the traffic connection control protocol stack adds the RTP/RTCP, UDP and IP for the voice traffic transfer and includes the Voice Encoded Data, LLC, MAC and Physical.

In order to further achieve the above objects in whole or in parts, there is provided a system for inter-working a RAN in an IP based CN, including protocols for establishing the signal connection and the traffic transmission connection required for the matching of the two networks, wherein such protocols include an M3UA for conducting the matching function between the MT3 protocol which transfers messages on the conventional wire No. 7 signal network and the IP network; the SCTP for transferring signal messages on the IP based network with reliability; the LLC for conducting the control function of the link level on the Internet; the MGCP for conducting the gateway control function required for physical matching the conventional PSTN and the IP network; the UDP for transferring [non-connection type higher level application messages] on the IP network; the IP to be used as the message routing basis on the Internet; and the MAC for conducting the control function of the physical link level on the Internet. Here, the MGCP is additionally used for the status control of the BSS-IP and the connection control of the traffic from the BSS-IP to the IP based network.

Preferably, the certain protocols for conducting the signal connection further include the IOS Application for conducting the call connections and disconnections for mobile communication subscribers; and the SCCP for conducting the reliable signal data transfer function with respect to the higher level application signal protocols.

Preferably, the certain protocols for conducting the traffic transmission connection further include the RTP/RTCP for conducting the control and transfer functions required for transferring real-time messages on the IP based network. Here, the RTP/RTCP is conducted so as to facilitate the traffic transfer and is executed based upon the UDP and IP.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made to preferred embodiments of the present invention as illustrated in the accompanying drawings. As described below, a method and a system is provided for matching primary network components, such as the mobile switching center (MSC) and the base station controller (BSC), so as to inter-work an ANSI Type RAN in an IP based CN, while causing minimum modifications in the currently operated ANSI type RAN and establishing the IP based CN for accommodating the IP based ANSI type RAN.

Figure 2:
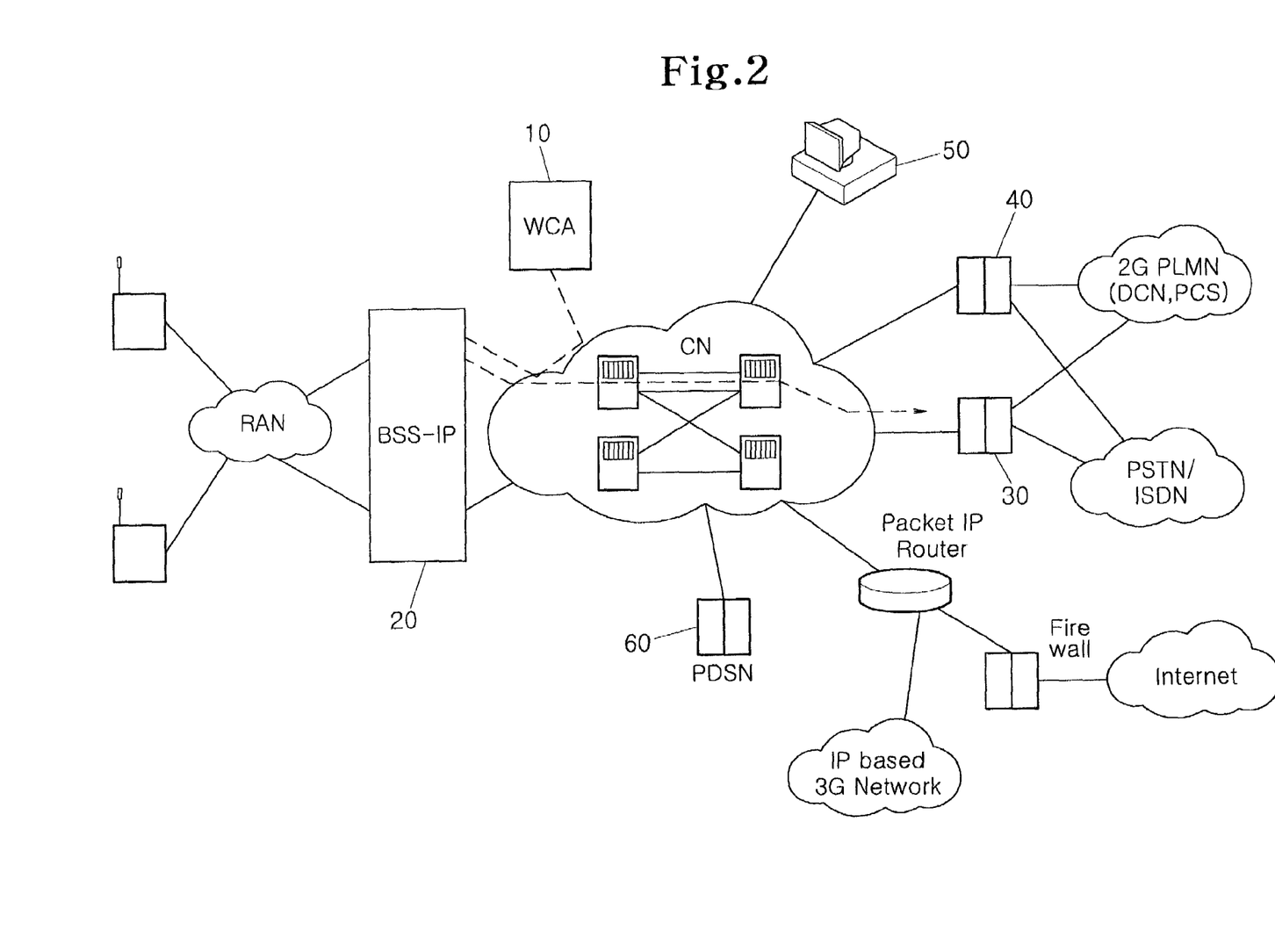
FIG. 2 is a diagram illustrating the structure of the system for inter-working a RAN in the IP based CN according to a preferred embodiment of the present invention.

FIG. 2 illustrates the structure of a system for inter-working a RAN in the IP based CN according to a preferred embodiment of the present invention. The system preferably includes a Wireless Call Agent (WCA) 10 for conducting call connections and routing functions by controlling all gateways accommodated in the IP based CN, such as a Radio Access Network Controller (RNC), and a Base Station Subsystem for Internet Protocol (BSS-IP) 20 for conducting gateway functions by controlling the RAN and communicating with the WCA 10. The system also preferably includes a Trunk Gateway (TG) 30 for conducting voice traffic matching functions between the IP based CN and the conventional wire network such as a PSTN (Public Switched Telephone Network), and providing service functions unique to voice communication, such as tone or announcement broadcast and so forth. A Signaling Gateway (SG) 40 is provided to match the No. 7 signal connection between the IP based CN and a wire network such as a PSTN, and an HLR 50 is provided for managing mobile communication subscribers' locations within the mobile communication network and conducting the mobility control. The system also preferably includes a PDSN 60 for conducting the inter-working of the IP network and the mobile communication CN so as to provide packet data services for the mobile communication subscribers.

According to the preferred embodiment, the WCA 10, which controls mobile calls in the IP based CN, and the BSS-IP 20, which controls the RAN and inter-working with the IP based CN, are major network components. The WCA 10 and the BSS-IP 20 are, respectively, comparable to the related art MSC and BSC. The structures of the WCA 10 and the BSS-IP 20, however, are different from those of the MSC and BSC. Thus, the IP based CN may be routed by the IP in accordance with the connection of the ATM (Asynchronous Transfer Mode) or a high-speed packet network, such as the Fast Ethernet.

The preferred embodiment provides a network structure and matching protocols so as to conveniently provide IP network services, such as Internet services, by efficiently connecting the RAN with the IP based CN. In particular, new inter-working protocol stacks between the RNC and the MSC are suggested in the preferred embodiment.

The protocol stacks between the BSS-IP 20 and the WCA 10 preferably include the related art matching protocols between the BSS and the MSC, which correspond to "A1" of the matching standards recommended in "TIA/EIA 3G-IOS V4.0.0 V&V Draft 5 November 1999." To transfer a call control message or a traffic message of mobile devices, however, the methods for signal transfer and traffic transfer based upon the IP are required.

Figure 3:
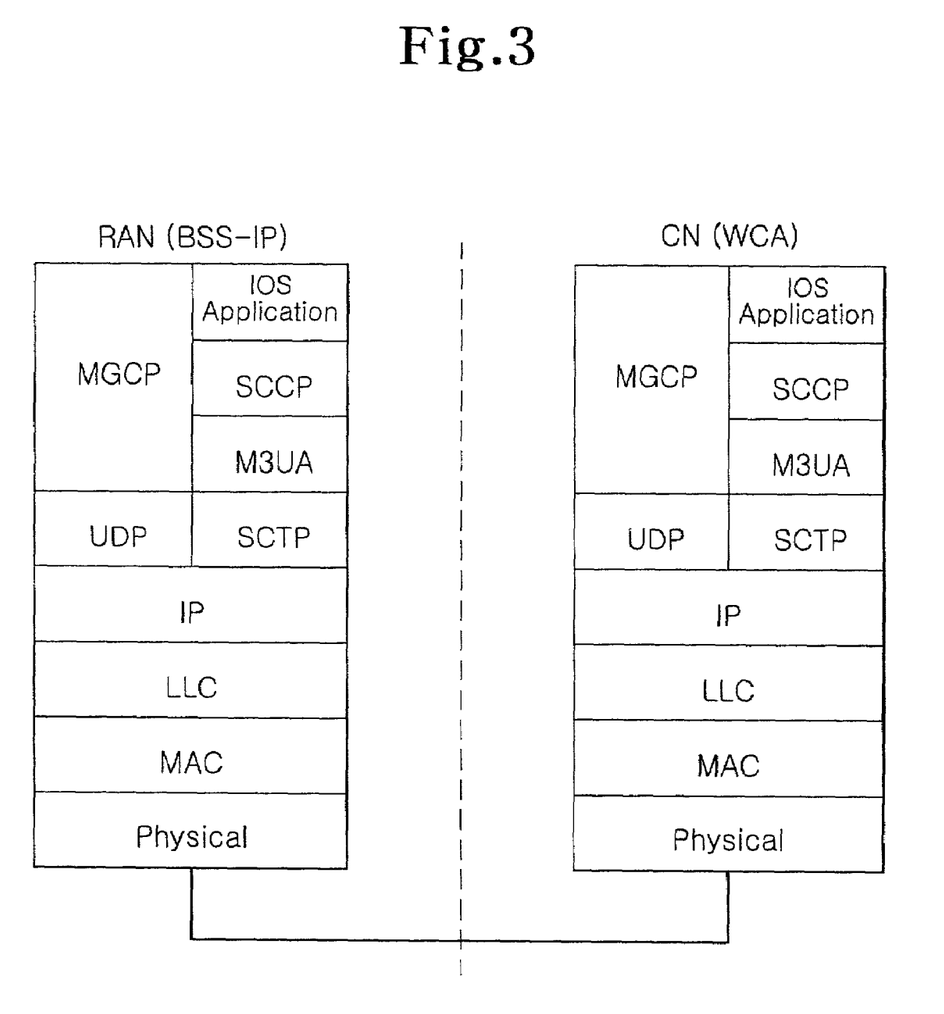
FIG. 3 illustrates matching signal protocol stacks of the RAN and the CN of FIG. 2.

Thus, the matching signal protocol stacks shown in FIG. 3 are preferably provided for the signal connection transfer. To operate the conventional "A1" matching protocol stack based upon the IP, protocols below the MTP3 layer in the signal connection control protocol stack are preferably matched with the M3UA, SCTP, and IP layers. For the control of the status and connection control of BSS-IP 20, the Media Gateway Control Protocol (MGCP) is preferably added. The M3UA preferably inter-works with the MTP3 protocol to conduct the message transfer function on a wire-based No. 7 signal network, and also inter-works with the IP network.

The SCTP preferably conducts the function of reliably transferring signal messages on the IP based network. The IP is the protocol used as the message routing basis on the Internet. The MGCP preferably conducts the gateway control function required for the physical matching function between the PSTN and the IP network.

Additionally, the matching signal protocol stack preferably includes the IOS Application for performing call connection and disconnection for mobile communication subscribers, the SCCP for conducting the reliable signal data transfer function with respect to the higher level application signal protocols, and the UDP for transferring non-connection type higher level application messages in the IP network. The matching signal protocol also preferably includes the LLC for conducting the link level control functions on the Internet, the MAC layer for conducting the physical level control functions on the Internet; and the Physical layer.

Figure 4:
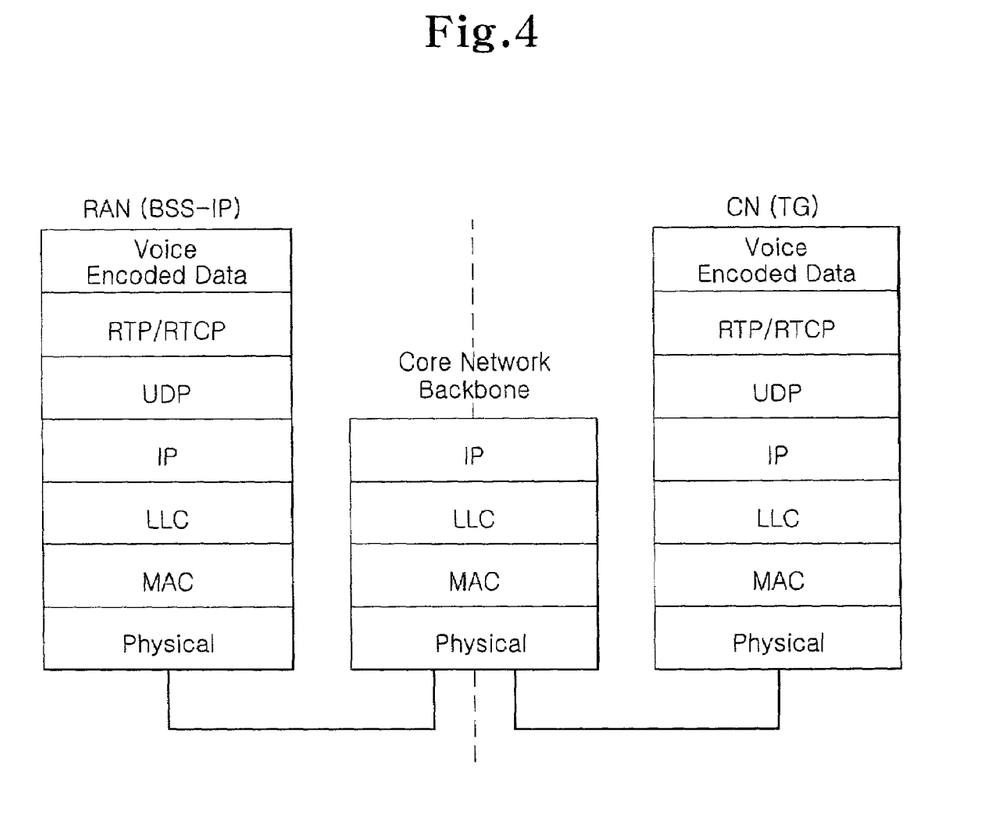
FIG. 4 illustrates matching traffic protocol stacks of the RAN and the CN of FIG. 2.

As shown in FIG. 4, the traffic connection control protocol stacks of the preferred embodiment include RTP/RTCP, UDP, and IP for the voice traffic transfer instead of the related art circuit matching based upon the TDM. The RTP/RTCP performs the control and transfer functions required for transferring real-time messages, such as voice, on the IP based network. Additionally, the traffic connection control protocol stacks include the Voice Encoded Data, LLC, MAC, and the Physical layer.

Consequently, the preferred embodiment includes the IP based signal protocols and the gateway control protocols for controlling and matching the RAN to the conventional mobile call control protocol stacks composed of the circuit based signal protocols. For the higher-level application protocols, the preferred embodiment may use the related art mobile control protocol for the compatibility.

For the signal message transfer of mobile devices, the BSS-IP 20 and the WCA 10 preferably use the related art higher-level application protocols without modification. With respect to the lower level signal transfer protocols, messages are preferably transferred through the high-speed physical connection. They are matched with the M3UA, which performs the message conversion processing functions, based upon the SCCP, the SCTP, which is the IP based common signal transfer protocol, and the IP.

For the status control of the BSS-IP 20 and the traffic connection control from the BSS-IP 20 to the IP based network, the gateway control protocol MGCP is additionally used. In order to facilitate the traffic transfer, such as the voice transfer, the RTP/RTCP's real-time traffic transfer and control functions are conducted. The RTP/RTCP is conducted upon the UDP and the IP.

Figure 5:
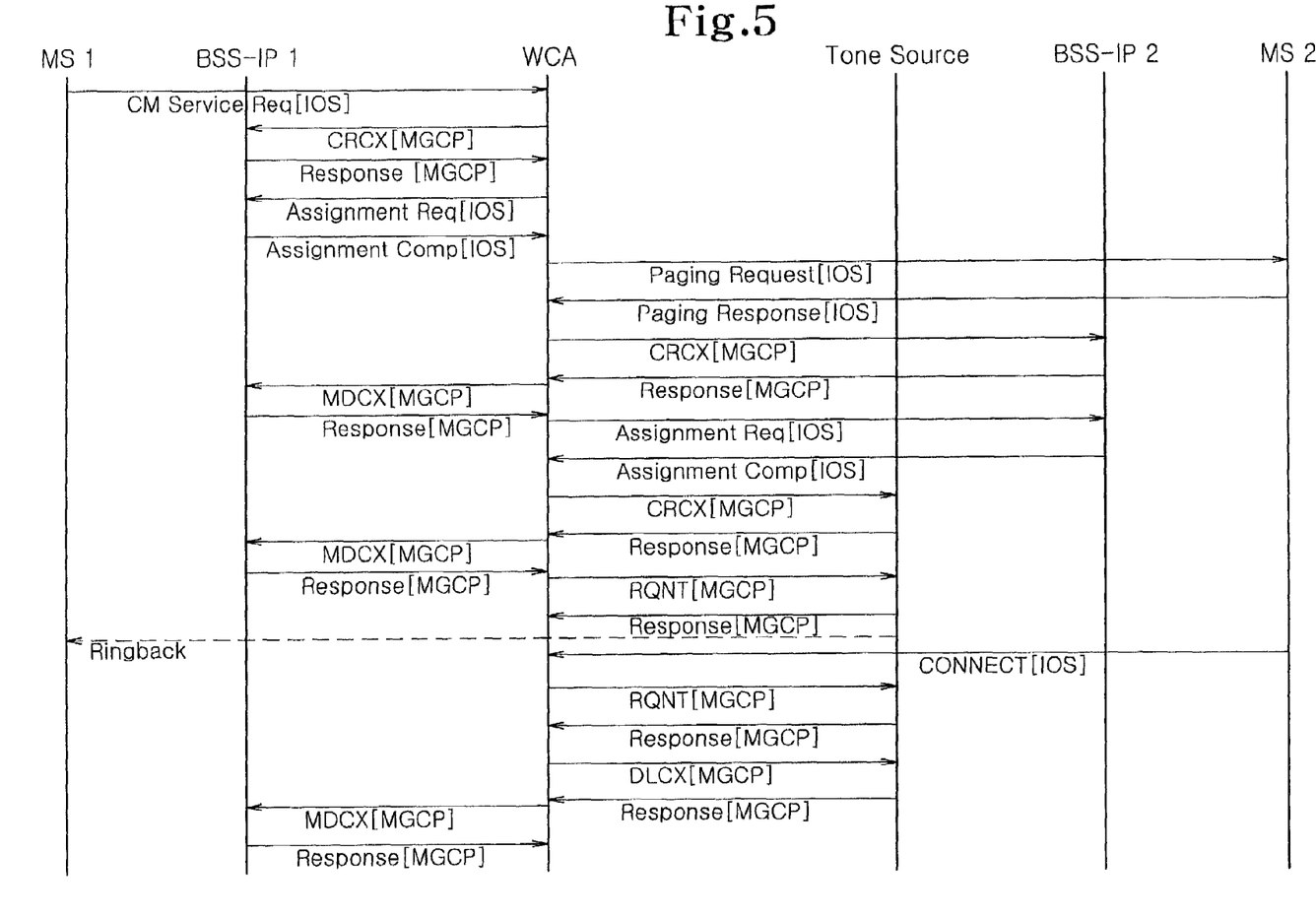
FIG. 5 is a flow chart illustrating the method for inter-working a RAN in the IP based network according to a preferred embodiment of the present invention.

FIG. 5 is a flow chart illustrating the method for interworking a RAN in the IP based CN according to a preferred embodiment of the present invention. First, a call connection request message, which is an IOS message (CM Service Req. [IOS]), is transmitted from an originating MS (MS1) to the WCA through an originating BSS-IP (BSS-IP1). Then, the WCA, having received the call connection request message (CM Service Req. [IOS]) from the MS1, preferably interprets the directory number (DN) of the receiving MS (MS2) as requested by the MS1.

If it is determined that the DN interpreted by the WCA is valid, the WCA transmits a connection request message (CRCX [MGCP]) to the BSS-IP1 using the MGCP. The MS1 may thus assign an IP network traffic port (UDP Port) for the connection with the call receiving side later.

Then, the BSS-IP1 assigns a traffic connection port to the IP network for the MS1, and generates a response message (Response [MGCP]) regarding such assignment. The BSS-IP1 transmits the response message to the WCA.

The WCA transmits a resource assignment request (Assignment Req. [IOS]) to the BSS-IP1 so as to enable the physical traffic connection path and various information connection paths to be established between the BSS-IP and the MS1. Here, of the conventional IOS message information components, the UDP port number is preferably used instead of the circuit identity code (CIC).

The BSS-IP1 then confirms whether the traffic connection with the MS1 has been completed, and transmits an IOS response message (Assignment Comp. [IOS]) to the WCA if the traffic connection has been completed.

The WCA interprets the call receiving number and preferably transmits an IOS paging message (Paging Request [IOS]) to the MS2 through a receiving BSS-IP (BSS-IP2) associated with the MS2.

Then, the MS2 recognizes the paging message (Paging Request [IOS]) and transmits an IOS message (Paging Response [IOS]) to the WCA through the BSS-IP2. This informs the WCA that the MS2 has been paged.

Thereupon, the WCA assigns the UDP port to the BSS-IP2 associated with the MS2 so that the traffic with the originating side may be established. The WCA also transmits an MGCP message (CRCX [MGCP]) to the BSS-IP2 to request the IP network's available connection port (UDP port).

The BSS-IP2 then assigns the traffic connection port of the MS 2 and transmits a response message (Response [MGCP]) to the WCA.

The WCA transmits a resource assignment request IOS message (Assignment Req. [IOS]) to the BSS-IP2 for the physical traffic connection path and various information connections between the BSS-IP2 and the MS2. Here, of the IOS message information components, the UDP port number is used instead of the CIC.

Then, the BSS-IP2 confirms whether the traffic connection with the MS2 has been established and transmits an IOS response message (Assignment Comp. [IOS]) to the WCA if the traffic connection has been completed.

The WCA preferably next transmits an IP network traffic connection request message (CRCX [MGCP]) to the tone source using the MGCP so that the MS1 may receive a ring-back tone indicating that the call receiving side is being paged. Here, the IP traffic UDP port number of the MS1 is transmitted as well, so as to enable the tone connection. Moreover, the information relating to the voice message transcoding method on the user traffic and the protocol (RTP/RTCP) for the end-to-end real time message processing is preferably transmitted as well.

The tone source accommodates the WCA's request and modifies the MS1's connection traffic path to the ring-back tone traffic channel, thereby connecting the IP traffic port of the MS1 with the tone traffic channel. Then, the tone source transmits a response message (Response [MGCP]) to the WCA.

The WCA preferably transmits an MGCP modification connection request message (MDCX [MGCP]) to the BSS-IP1 using the previously assigned user port for the IP traffic connection request with the tone source so as to enable the MS1 to hear the ring-back tone. With the message, information relating to the voice message transcoding method on the user traffic and the protocol (RTP/RTCP) for the end-to-end real time message processing is preferably transferred as well.

Next the BSS-IP1 accommodates the WCA's request and modifies the MS1's connection traffic path to the ring-back tone traffic channel, thereby connecting the MS1's IP traffic port with the ring-back tone traffic channel. The BSS-IP1 then transmits a response message (Response [MGCP]) to the WCA.

The WCA preferably transmits a notification request message (RQNT [MGCP]) using the MGCP to the tone source so that the ring-back tone may be transmitted to the MS1. The tone source generates the ring-back tone through the traffic channel of the MS1 by referring to the notification request message (RQNT [MGCP]) received from the WCA, and transmits a response message (Response [MGCP]) to the WCA.

From this point, the MS1 and the BSS-IP1 process the audio message during the tone generation period, thereby receiving the ring-back tone indicating that MS1 is paging the call receiving side.

If the MS2 responds to the paging signal, the MS2 preferably transmits a connection message (CONNECT [IOS]) to the WCA through the BSS-IP2 to indicate that it has replied to the call. The WCA recognizes such response message of the MS2 and preferably transmits a notification request message (RQNT [MGCP]) using the MGCP to the tone source to stop the ring-back tone transmission to the originating side. The tone source thus stops the generation of the ring-back tone, and then transmits a response message (Response [MGCP]) to the WCA.

The WCA preferably next transmits a connection deletion message (DLCX [MGCP]) to the tone source to disconnect the IP network connection traffic on the tone source, which was made for the transmission of the ring-back tone. Thereupon, the tone source disconnects its existing tone connection path upon the IP network and transmits a response message (Response [MGCP]) to the WCA.

Thereafter, for the IP network traffic connection between the MS2 and the MS1, the WCA preferably transmits an MGCP modification connection request message (MDCX [MGCP]) to the BSS-IP1 so as to modify the ring-back tone connection path to the BSS-IP2's traffic channel. The BSS-IP2's user traffic UDP port number and the information relating to the voice message transcoding method on the user traffic and the protocol (RTP/RTCP) for the end-to-end real time message processing is transmitted as well.

The BSS-IP1, in compliance with the WCA's request, preferably connects the MS1's IP network traffic channel to the BSS-IP2's user traffic channel and then transmits a response message (Response [MGCP]) to the WCA.

Then, the WCA transmits an IOS connection message to MS1, indicating that the MS2 has responded to the call. Consequently, the call connection between the MS1 and the MS2 is established.

As explained above, the preferred embodiment of the present invention has many advantages. For example, the preferred embodiment provides a unified communication network by matching the RAN and the CN based upon the IP, and provides a method and system for the signal connection and traffic transfer connection required for the network matching. As a result, a CN may be established, having the transfer path between a RAN and the CN based upon the common technology such as the IP, facilitating the convenient construction of the system and saving the relevant costs.

Furthermore, because the preferred embodiment accommodates a RAN directly into the IP basis, no separate conversion device is required for the wireless Internet service provision. Consequently, service may be provided with expediency and the high performance may also be achieved.

The preferred embodiment of the present invention provides a unified communication network by matching the RAN and the CN based upon the IP and provides a method and a system for the signal connection and traffic transfer connection required for the network matching. As a result, a CN may be established, having the transfer path between a RAN and the CN based upon the common technology such as the IP, facilitating the convenient construction of the system and saving the relevant costs.

Furthermore, because the present invention accommodates a RAN directly within the IP basis, no separate conversion device is required for the wireless Internet service provision. Consequently, the service may be provided with expediency and the high performance may also be achieved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for inter-working a radio access network (RAN) in an internet protocol (IP) based core network (CN), comprising:

establishing a traffic connection between a first mobile station (MS) and a first base station subsystem for IP (BSS-IP) using a prescribed protocol upon receiving a call connection request message from the first MS, the establishing including transmitting a call connection request message from the first MS through the first BSS-IP to a wireless call agent (WCA), confirming completion of the traffic connection to the first MS and transmitting a response message from the first BSS-IP to the WCA;

interpreting, at the WCA, a directory number (DN) of a second MS as requested by the first MS and establishing a traffic connection between the second MS and a second BSS-IP using a prescribed protocol, the WCA being coupled between the first BSS-IP and the second BSS-IP;

generating a ring-back tone using a prescribed protocol so that the first MS receives the ring-back tone; and stopping the generation of the ring-back tone using a prescribed protocol if the second MS responds, and establishing a call connection between the first MS and the second MS.

2. The method of claim 1, wherein the first MS is a call originating MS, the second MS is a call receiving MS, the first BSS-IP is associated with the first MS, and the second BSS-IP is associated with the second MS.

3. The method of claim 1, wherein the prescribed protocols comprise matching signal protocols for the signal connection transfer and the traffic connection control protocols.

4. The method of claim 3, wherein the matching signal protocols comprise at least one of M3UA (MTP3 User Adaptation), SCTP (Stream Control Transmission Protocol), IP, MGCP (Media Gateway Control Protocol), IOS Application, SCCP (Signaling Connection Control Protocol), UDP (User Datagram Protocol), LLC (Logical Link Control), and Physical, and wherein the traffic connection control protocols include RTP (Real Time Protocol)/RTCP (Real Time Control Protocol), UDP, IP, Voice Encoded Data, LLC, MAC, and Physical.

5. The method of claim 1, wherein the establishing the traffic connection between the first MS and the first BSS-IP further comprises:
 interpreting the DN of the second MS as requested by the first MS at the WCA after the transmitting the call connection request message from the first MS through the first BSS-IP to the WCA;
 transmitting a connection request message from the WCA to the first BSS-IP using the MGCP if the DN is determined to be valid;
 assigning traffic connection ports to the IP network of the first MS and transmitting a response message from the first BSS-IP to the WCA; and
 transmitting a resource assignment message from the WCA to the first BSS-IP using the UDP port number before the confirming the completion of the traffic connection to the first MS and the transmitting response message from the first BSS-IP to the WCA.

6. The method of claim 1, wherein establishing the traffic connection between the second MS and the second BSS-IP comprises:
 transmitting a paging message from the WCA to the second MS through the second BSS-IP by interpreting the DN of the second MS as requested by the first MS;
 responding to the WCA by transmitting an IOS message from the second MS to the WCA through the second BSS-IP upon recognizing the paging message;
 assigning UDP ports to the second BSS-IP for the traffic connection with the first BSS-IP, and requesting a connection with an available connection port of an IP network to be connected to the second BSS-IP, by transmitting an MGCP message;
 assigning the traffic connection ports of the second MS and transmitting a response message from the second BSS-IP to the WCA;
 transmitting a resource assignment message from the WCA to the second BSS-IP using the UDP port number; and
 confirming the completion of the traffic connection to the second MS and transmitting a response message from the WCA.

7. The method of claim 1, wherein generating the ring-back tone comprises:
 transmitting to a tone source an IP network traffic connection request message together with an IP traffic UDP port number of the first MS, a user traffic's voice message transcoding method, and protocol information for end-to-end real-time message processing, using MGCP, so that the first MS may receive the ring-back tone;
 modifying a connection traffic path of the first MS to the currently managed ring-back tone traffic channel;
 connecting the IP traffic port of the first MS to the ring-back tone traffic channel and transmitting a response message to the WCA;
 transmitting to the first BSS-IP a modification connection request message together with the user traffic's voice message transcoding method and the protocol information for the end-to-end real-time message processing, using the previously assigned user ports;
 modifying the connection traffic path of the first MS to a ring-back tone traffic channel;
 connecting the IP traffic port of the first MS to the ring-back tone traffic channel and transmitting a response message to the WCA;
 transmitting a notification request message to the tone source using the MGCP; and
 generating the ring-back tone through the traffic channel of the currently connected MS by referring to the notification request message and then transmitting a response message to the WCA.

8. The method of claim 1, wherein establishing the call connection between the first MS and the second MS comprises:
 transmitting a connection message from the second MS to the wireless call agent (WCA) through the second BSS-IP using an IOS message;
 transmitting a notification request message to a tone source using MGCP;
 stopping the generation of the ring-back tone which has been transmitted and transmitting a response message to the WCA;
 transmitting a connection delete message to the tone source;
 disconnecting a tone connection path on the IP network and then transmitting a response message to the WCA;
 transmitting a modification connection request message to the first BSS-IP together with a user traffic UDP port number of the second BSS-IP, voice message transcoding method on the user traffic and the protocol information for end-to-end real-time message processing;
 connecting the IP network traffic channel of the currently managed first MS to the user traffic channel of the second BSS-IP and transmitting a response message to the WCA; and
 transmitting a connection message to the first MS to establish the call connection between the first MS and the second MS.

9. A system for inter-working a Radio Access Network (RAN) in an IP based Core Network (CN) comprising:
 a Wireless Call Agent (WCA) to conduct call connections and routing functions by controlling all gateways accommodated in the IP based CN;
 at least one Base Station Subsystem for Internet Protocol (BSS-IP) configured to conduct gateway functions by controlling the RAN and communicating with the WCA, the WCA being coupled between at least two BSS-IP;
 a Trunk Gateway (TG) configured to conduct voice traffic matching functions between the IP based CN and a wire-based network, and to provide service functions unique to voice communication;
 a Signaling Gateway (SG) configured to provide No. 7 signal connection matching functions between the IP based CN and the wire-based network;
 a Home Location Register (HLR) configured to manage mobile communication subscribers' locations within a mobile communication network, and to perform mobility control; and a Packet Data Serving Node (PDSN) configured to conduct inter-working of the IP network and the mobile communication CN so as to provide packet data services for the mobile communication subscribers, wherein the WCA receives a call connection request message from a first MS through a first BSS-IP of the at least one BSS-IP, receives a response message from the first BSS-IP after confirmation of completion of a traffic connection to the first MS, transmits a paging message to the second MS through a second BSS-IP of the at least one BSS-IP by interpreting a directory number (DN) of the second MS as requested by the first MS, and transmits a response message after confirmation of the completion of a traffic connection to the second MS.

10. The system of claim 9, wherein the IP based CN may be routed by IP, based upon an Asynchronous Transfer Mode (ATM) connection, or a high-speed packet network.

11. The system of claim 9, wherein matching signal protocol stacks are provided between the BSS-IP and the WCA for the signal connection transfer, and traffic connection control protocol stacks are provided between the BSS-IP and the TG.

12. The system of claim 11, wherein the matching signal protocol stack is configured to match protocols below an MTP3 layer with M3UA, SCTP, and IP, add the MGCP to control the BSS-IP's status and connection, and include an IOS Application, SCCP, UDP, LLC, MAC, and Physical layer.

13. The system of claim 11, wherein the traffic connection control protocol stack adds the RTP/RTCP, UDP, and IP for the voice traffic transfer, and includes the Voice Encoded Data, LLC, MAC, and Physical layer.

14. A system for inter-working a Radio Access Network (RAN) in the IP based Core Network (CN), comprising protocols for establishing a unified IP based communication network by matching the RAN and the CN, and for signal connection and traffic transmission connection required for the matching of the two networks, wherein the protocols comprise:

an MTP-3 User Adaptation layer (M3UA) to match an MT3 protocol, which transfers messages on a wire-based No. 7 signal network, and the IP network;

a Stream Control Transmission Protocol (SCTP) to reliably transfer signal messages on the IP based network;

a Logical Link Control (LLC) to control a link level on the Internet;

a Media Gateway Control Protocol (MGCP) to provide a gateway control function required for physical matching of a PSTN and the IP network;

a User Datagram Protocol (UDP) for transferring non-connection type higher level application messages on the IP network;

the Internet Protocol (IP) used as a message routing basis on the Internet; and a Media Access Control (MAC) to control the physical link level on the Internet, wherein the MGCP is additionally used for the status control of the BSS-IP and the connection control of a Base Station Subsystem for Internet Protocol (BSS-IP) and the connection control of the traffic from the BSS-IP to the IP based network.

15. The system of claim 14, wherein the protocols for conducting the signal connection further comprise:

an IOS Application to perform call connections and disconnections for mobile communication subscribers; and an Signaling Connection Control Protocol (SCCP) to provide reliable signal data transfer function with respect to the higher-level application signal protocols.

16. The system of claim 14, wherein the protocols for conducting the traffic transmission connection further comprise an RTP/RTCP to perform control and transfer functions required for transferring real-time messages on the IP based network.

17. The system of claim 16, wherein the RTP/RTCP is conducted so as to facilitate the traffic transfer and is executed based upon the UDP and IP.

18. A system for inter-working a Radio Access Network (RAN) in the IP based Core Network (CN), comprising:

fast and second mobile stations (MS);

first and second base station subsystems for Internet protocol (BSS-IP) coupled to the first and second MS, respectively; and a wireless call agent (WCA) coupled between the first and second BSS-IP, wherein the first MS is configured to establish a traffic connection between the first MS and the first BSS-IP using a prescribed protocol, wherein the second BSS-IP is configured to establish a traffic connection using a prescribed protocol between the second MS and a second BSS-IP based on a directory number (DN) of the second MS as requested by the first MS, and wherein a call connection is established between the fast MS and the second MS using the WCA in accordance with the established traffic connections between each MS and BSS-IP.

19. The system of claim 18, wherein establishing the traffic connection between the first MS and the first BSS-IP comprises:

transmitting a call connection request message from the first MS through the first BSS-IP to the WCA;

interpreting the DN of the second MS as requested by the first MS;

transmitting a connection request message from the WCA to the first BSS-IP using a MGCP if the DN is determined to be valid;

assigning traffic connection ports to the IP network of the first MS and transmitting a response message from the first BSS-IP to the WCA;

transmitting a resource assignment message from the WCA to the first BSS-IP using the UDP port number; and confirming the completion of the traffic connection to the first MS and transmitting a response message from the first BSS-IP to the WCA.

20. The method of claim 18, wherein establishing the traffic connection between the second MS and the second BSS-IP comprises:

transmitting a paging message from the WCA to the second MS through the second BSS-IP by interpreting the DN of the second MS as requested by the first MS;

responding to the WCA by transmitting an IOS message from the second MS to the WCA through the second BSS-IP upon recognizing the paging message;

assigning UDP ports to the second BSS-IP for the traffic connection with the first BSS-IP, and requesting a connection with an available connection port of an IP network to be connected to the second BSS-IP, by transmitting an MGCP message;

assigning the traffic connection ports of the second MS and transmitting a response message from the second BSS-IP to the WCA;

transmitting a resource assignment message from the WCA to the second BSS-IP using the UDP port number; and confirming the completion of the traffic connection to the second MS and transmitting a response message from the WCA.

21. The method of claim 18, wherein establishing the call connection between the first MS and the second MS comprises:

transmitting a connection message from the second MS to the WCA through the second BSS-IP using an IOS message;

transmitting a modification connection request message to the first BSS-IP together with a user traffic UDP port number of the second BSS-IP, voice message transcoding method on the user traffic and the protocol information for end-to-end real-time message processing;

connecting an IP network traffic channel of the first MS to the user traffic channel of the second BSS-IP and transmitting a response message to the WCA; and transmitting a connection message to the first MS to establish the call connection between the first MS and the second MS.

* * * * *